United States Patent

Yokoyama

(10) Patent No.: US 7,336,385 B2
(45) Date of Patent: Feb. 26, 2008

(54) INFORMATION PROCESSING APPARATUS AND INFORMATION PROCESSING METHOD

(75) Inventor: Noboru Yokoyama, Toyko (JP)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 10/718,603

(22) Filed: Nov. 24, 2003

(65) Prior Publication Data

US 2004/0105120 A1    Jun. 3, 2004

(30) Foreign Application Priority Data

Nov. 28, 2002  (JP) .............................. 2002-345022

(51) Int. Cl.
*G06K 1/00* (2006.01)
*H04N 1/00* (2006.01)
*H04N 1/40* (2006.01)

(52) U.S. Cl. .................... 358/1.15; 358/1.16; 358/434; 358/444

(58) Field of Classification Search ............... 358/1.15, 358/1.16, 434, 444, 448, 403; 382/303, 304, 382/305, 306
See application file for complete search history.

(56) References Cited

U.S. PATENT DOCUMENTS 6,724,497 B1 *  4/2004  Takahashi .................. 358/1.15
2002/0067861 A1 *  6/2002  Mita et al. .................. 382/248
2003/0071906 A1 *  4/2003  Matsumoto ................. 348/241

* cited by examiner

*Primary Examiner*—Houshang Safaipour
(74) *Attorney, Agent, or Firm*—Fitzpatrick, Cella, Harper & Scinto

(57) ABSTRACT

An information processing system includes an information processor for transmitting image data to an image processor together with device information, and plural image processors for performing, according to the device information, processes to the transmitted image data. The information processor comprises a setter to set the device information and command information, and a transmitter to transmit data including the device and command information to the image processor. The image processor comprises a device information memory, a device information setter to set the device information to the memory, and a selector to, according to the transmitted device information, set the device information according to the command information to the memory, change the command information, and select whether to transmit the data including the changed command information to the next image processor or transmit the transmitted data to the next image processor as it is.

6 Claims, 5 Drawing Sheets

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Related Background Art

In recent years, operation speed of a CPU (central processing unit) and capacities of an IC memory and a hard disk increase, whereby also an amount of data to be handled and processed by an information processing apparatus increases. Based on such an increase in the data amount, an amount of data to be transmitted and transferred among various blocks provided inside the information processing apparatus necessarily increases.

Incidentally, the related background art will be explained by taking an information processing apparatus of handling and processing image data as a representative example of an apparatus for handling and processing a large amount of data.

That is, such an image data processing apparatus roughly includes a portion which consists of a CPU, an IC memory and a hard disk for generally storing and processing the image data, and a hardware portion which completes the image process which could not be completely processed by the CPU during a required time. Here, the former portion has the structure being common to that of a general computer, whereby the same architecture as that in the general computer is applied to the former portion. Then, the latter portion (hardware portion) is added to the former portion.

Besides, in the image process, generally plural kinds of processes are performed to one image data. For example, color image data can be represented in various color spaces such as an RGB color space, a YUV color space, an Lab color space, a CMYK color space, and the like. Therefore, the color image data in a certain color space is input and processed in one image process, whereby it is necessary to convert the color space of the input color image data into a proper color space necessary in the image process. Moreover, the processed color image data is then converted into color image data in a desired color space, whereby, in such a case, the three kinds of processes (color space conversion, certain image process, and color space conversion) are sequentially performed in regard to the one image data.

FIG. 4 is a block diagram showing a conventional image processing apparatus. In FIG. 4, a master block 1 has the same structure as that of the general computer, in which a CPU 11 and a memory unit 12 are connected to each other by means of a data transmission path 13. On one hand, a slave block 2 includes an image processing unit 23 which achieves an image process independently of the CPU 11. The master block 1 and the slave block 2 are connected to each other by means of a data transmission path 3 through an I/F (interface) unit 10 and a packet selector 21. Moreover, the slave block 2 and a slave block 2' are connected to each other by means of a data transmission path 3' through a packet deselector 24 of the slave block 2 and the packet selector of the slave block 2', and then a last slave block 2" and the master block 1 are connected to each other by means of a data transmission path 4 through the packet deselector of the slave block 2" and the I/F unit 10 of the master block 1. Here, it should be noted that the block diagram shown in FIG. 4 is made simple for the sake of convenience in explanation, that is, the actual structure of the image processing apparatus is of course more complex.

FIG. 5 is a diagram for explaining the unit of data process to be performed by the image processing apparatus. As shown in FIG. 5, since an enormous amount of data are necessary for one image data, the one image data is divided into plural tiles each having a certain size so that the image processing unit 23 can easily process it. Moreover, in order to suppress or control the capacity of the memory unit 12 and also enable it to store the data of a large number of images, the data is stored in each tile in compressed form. The compressed image data on the tile is treated as a unit of process, whereby it is necessary to obtain the information representing, e.g., which tile (portion) in which image the compressed image data belongs to. Therefore, the data which consists of the obtained information as a header portion and the compressed image data as a data portion is treated as the actual unit of process, and this unit of process is called a packet.

In addition to the information representing which image the packet concerns and the information representing which portion of the image the tile concerns, the header portion of the packet includes information representing a kind of image data (e.g., color image data or black-and-white image data), information representing a used color space if the used data is the color image data, and the like. Moreover, in addition to the information concerning the image itself, the header portion of the packet includes information for designating what kind of image process should be performed to which block (i.e., block designation, and process designation).

FIG. 6 is a block diagram showing the internal structure of the I/F unit 10, and FIG. 7 is a block diagram showing the internal structure of the packet selector 21.

As shown in FIG. 6, the I/F unit 10 consists of a DMAC (direct memory access controller) 101 which reads the packet from a designated area of the memory unit 12 and sends the read packed to the data transmission path 3 without using the CPU 11, and a DMAC 102 which receives the packet sent from the data transmission path 4 and writes the received packet in a designated area in the memory unit 12 without using the CPU 11.

Moreover, as shown in FIG. 7, the packet selector 21 monitors the header portion of the packet sent from the data transmission path 3, and compares the block designation of the monitored head portion with a value ("X" in this case) of block discrimination setting 25. Then, the packet selector 21 controls a selector 212 so as to send the packet to a data transmission path 22 and otherwise sort or distribute the packet to appropriate image processing units 23 according to the process designation of the header portion, when the block designation of the head portion is not equal to the value of the block discrimination setting 25. Therefore, when the block designation of the header portion of the sent packet is different from the own block discrimination setting, the packet in question is sent to a next block as it is through the data transmission path 22.

The image processing unit 23 processes the input packet and then outputs the packet as the result of the process. At that time, the block designation and the process designation of the header portion of the output packet corresponding to the image processing unit 23 in question are deleted, or a process-end flag is set.

By doing so, the packet sent from the master block 1 is sequentially subjected to the necessary processes based on block discrimination settings 25', ..., and 25" by the slave blocks 2, 2', ..., and 2" through the data transmission paths 3', . . . , and 3" respectively, and then the processed packet is returned to the master block 1 through the data transmission path 4.

However, in the above related background art, because the block discrimination of the slave block is fixedly set, it is necessary to again allocate the block discrimination and to change software to be executed by the CPU 11 even in a similar system of which the number of slave blocks is different.

SUMMARY OF THE INVENTION

The present invention has been completed in consideration of the problem in the above related background art, and an object thereof is to provide an information processing apparatus which is equipped with a memory unit for storing a block discrimination in each slave block and a means for rewriting the block discrimination stored in the memory unit, and thus can reallocate block discriminations by using common software even when the number of the slave blocks is changed.

In order to achieve the above object, the present invention is characterized by an information processing apparatus in which one master block and plural slave blocks are provided, plural data transmission paths are provided between the master block and a first slave block and further between the subsequent adjacent slave blocks so as to link the master block, the first slave block, a second slave block, a third slave block, . . . , and the last slave block together, a data transmission path is further provided between the last slave block and the master block, and a packet is transmitted through these data transmission paths. Moreover, the above information processing apparatus includes a memory unit which stores discrimination information for discriminating each of the plural blocks, an initialization unit which initializes in the memory unit the discrimination information of the plural blocks to the same value, a rewriting unit which rewrites the memory unit in which the discrimination information of the blocks has been stored, a designation unit which designates to the header of the packet the discrimination information of the block in which the packet data should be processed, and an output unit which refers to the block discrimination information in the header of the packet sent from the input data transmission path to each block and then sends the packet as a result of the process or the input packet to the output data transmission path when the referred discrimination information is the same as the discrimination information being the content of the memory unit in the block in question.

Other object and features of the present invention will be apparent from the following description in conjunction with the accompanying drawings.

DETAILED DESCRIPTION OF THE PREFERRED EMBODIMENTS

Figure 1:
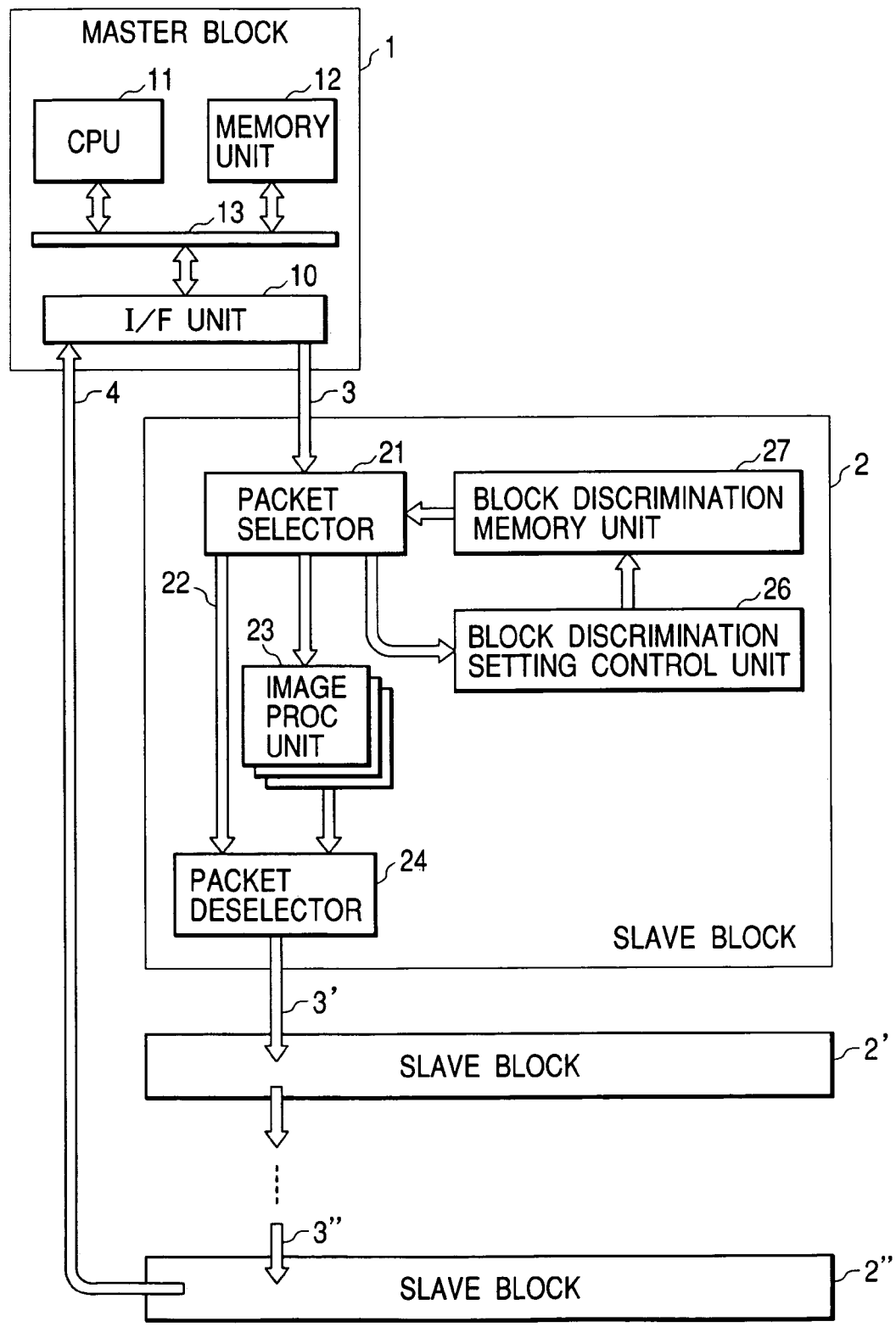
FIG. 1 is a schematic block diagram showing one example of an information processing apparatus.
Figure 4:
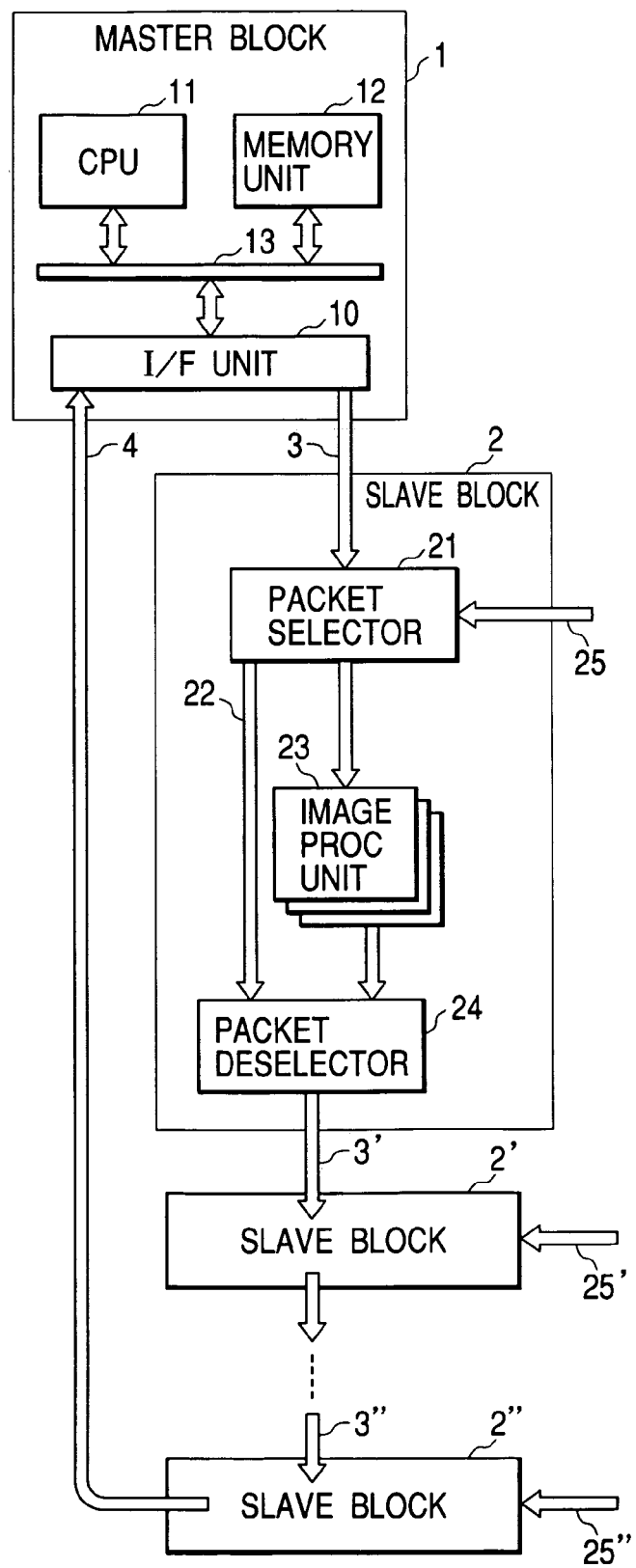
FIG. 4 is a schematic block diagram showing a conventional information processing apparatus.
Figure 5:
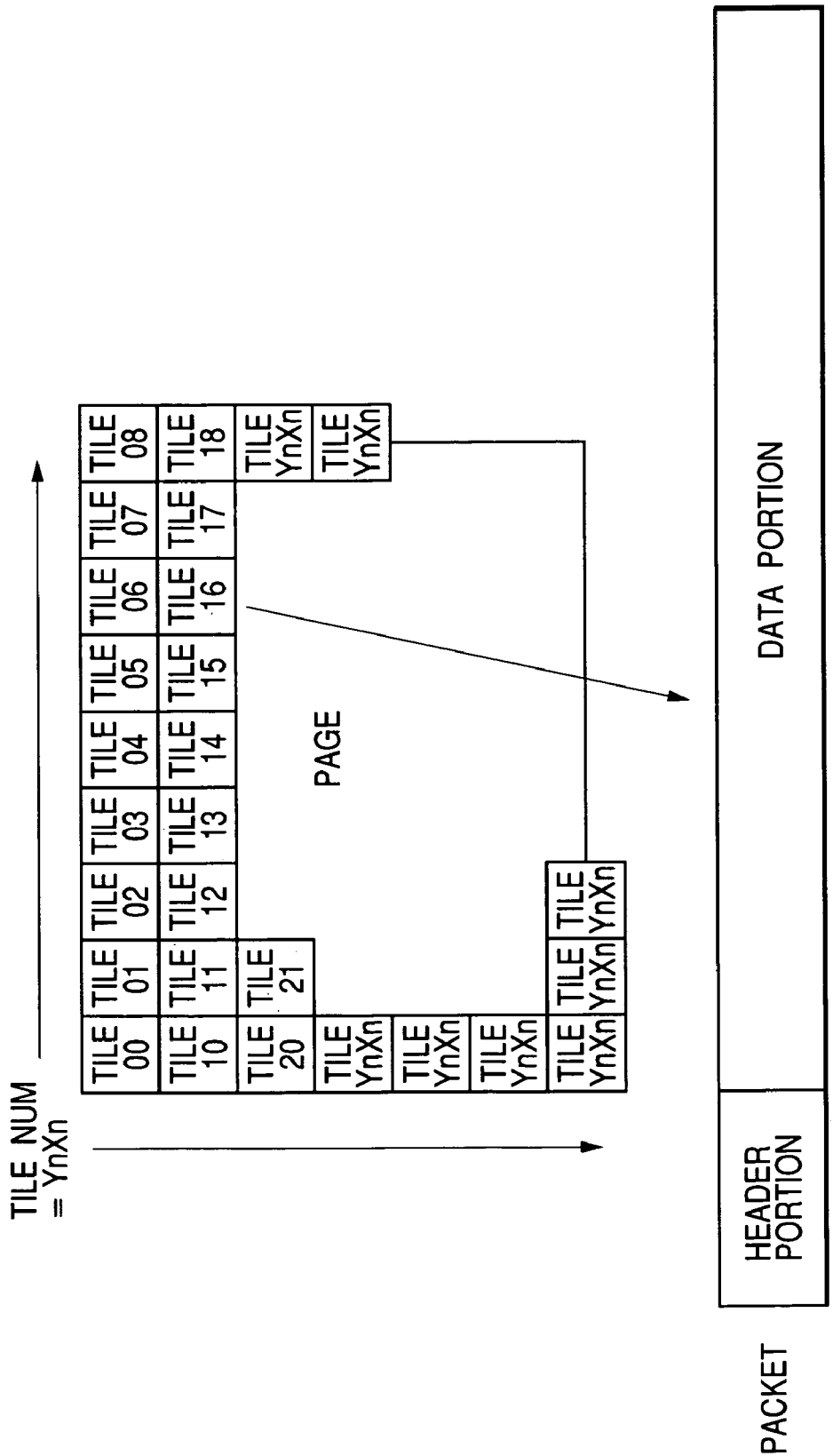
FIG. 5 is a view for explaining a packet.
Figure 6:
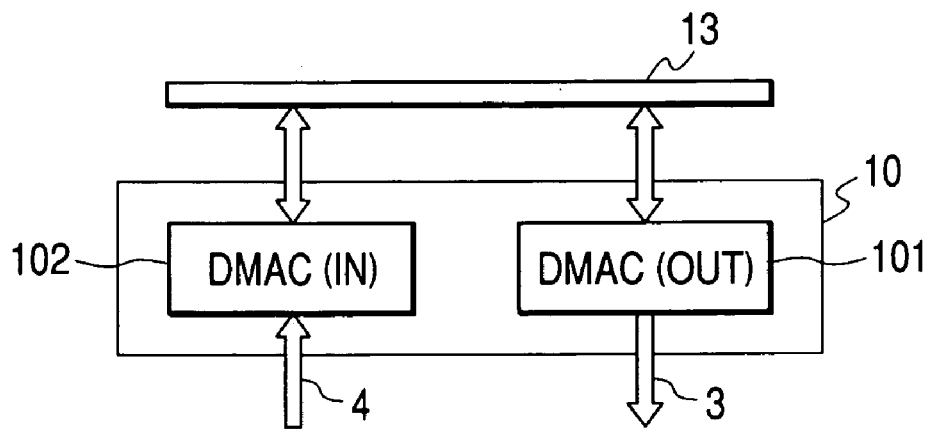
FIG. 6 is a detailed block diagram showing an I/F unit 10 shown in FIG. 4.
Figure 7:
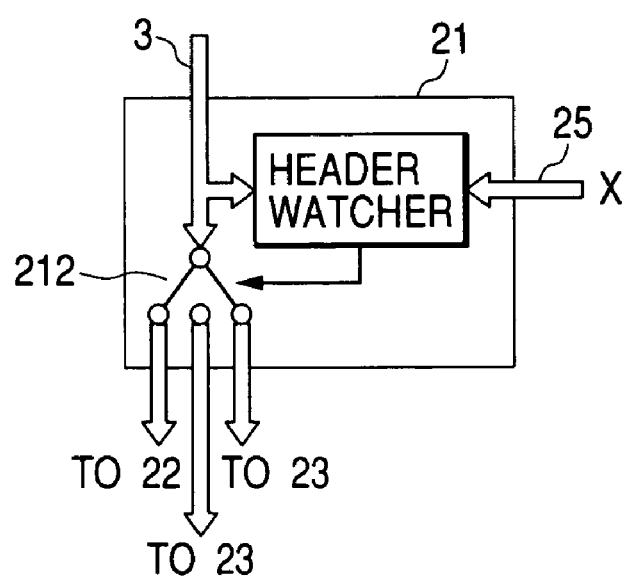
FIG. 7 is a detailed block diagram showing a packet selector 21 shown in FIG. 4.

Hereinafter, the present invention will be explained with reference to the accompanying drawings. FIG. 1 is a schematic block diagram showing one example of an information processing apparatus according to the present invention. In FIG. 1, it should be noted that the same structural components as those already explained in the above related background art are indicated by the same reference numerals as those shown in FIG. 4, respectively.

In FIG. 1, a master block 1 has the same structure as that of a general computer, in which a CPU 11 and a memory unit 12 are connected to each other by means of a data transmission path 13. On one hand, a slave block 2 includes an image processing unit 23 which achieves an image process independently of the CPU 11, a block discrimination (setting) memory unit 27 which stores therein block discrimination information, and a block discrimination setting control unit 26 which controls the block discrimination memory unit 27. The master block 1 and the slave block 2 are connected to each other by means of a data transmission path 3 through an I/F unit 10 and a packet selector 21.

Figure 2:
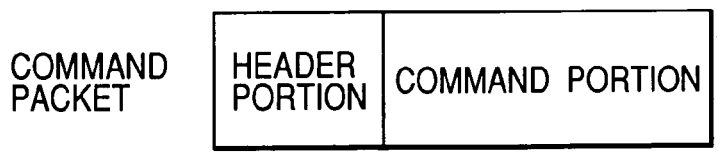
FIG. 2 is a view for explaining a command packet.

FIG. 2 is a view for explaining a packet for setting the block discrimination information. In the present embodiment, the block discrimination information in regard to each slave block is set by using the packet which is different from image data. Here, in order to distinguish the packet for setting the block discrimination information from a packet of the image data, it is assumed that the above former packet is called a command packet while above latter packet of the image data is called an image packet. The command packet can be discriminated from the data packet by checking on the header portion of the packet, and the block discrimination information to be set exists in the command portion of the command packet (this portion corresponding to the data portion of the data packet).

As well as the data packet, the header portion of the command packet necessarily includes block designation and process designation. In regard to the command packet, the block discrimination setting control unit 26 is designated as the process designation. However, the block designation is set by the command packet itself, whereby a correct or appropriate value cannot be designated before the block designation is set by the command packet.

For this reason, when the system is initialized (i.e., the system is reset), it is controlled to initialize the block discrimination memory unit 27 to a certain identical (same) value. In the present embodiment, it is assumed that the block discrimination memory unit 27 is initialized to "0" for purposes of explanation.

Figure 3:
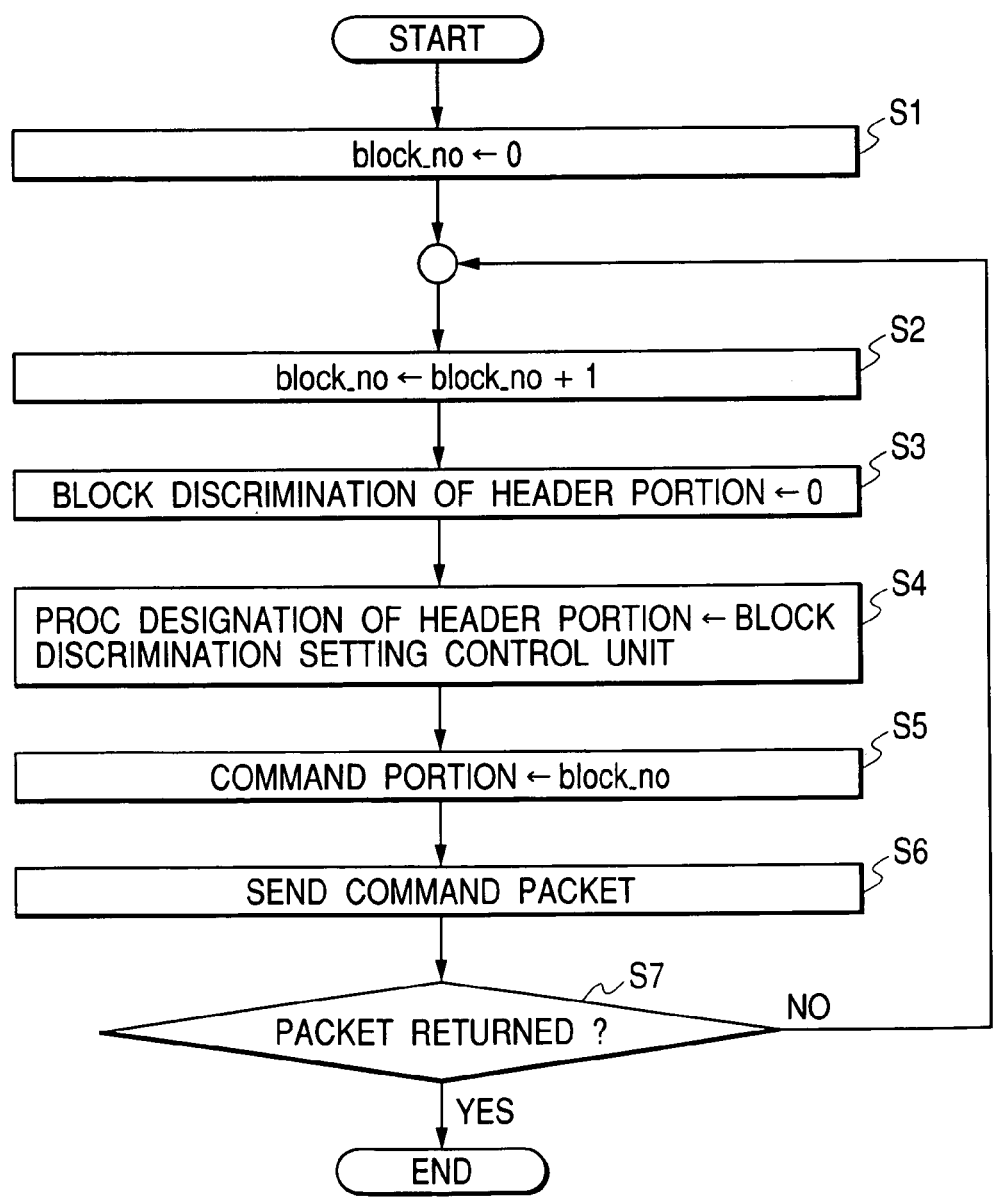
FIG. 3 is a flow chart for explaining an operation of a CPU 11 shown in FIG. 1.

FIG. 3 is a flow chart for explaining an operation of the CPU 11 in case of allocating the block discrimination information to each slave block.

First, the initial value "0" of the block discrimination memory unit 27 is set as the block designation of the header portion, the block discrimination setting control unit 26 is set as the process designation of the header portion, the command portion is designated as "1" (in the flow chart, a variable "block_no" is used), and the thus obtained command packet is sent (step S1).

Next, the first slave block 2 receives the sent command packet. Here, because the content of the block discrimination memory unit 27 coincides with the block designation of the header portion, the packet selector 21 of the slave block 2 transfers the received command packet to the block discrimination setting control unit 26. Therefore, the block discrimination setting control unit 26 sets "1" being the content of the command portion of the command packet to the block discrimination memory unit 27.

In a case where this command packet is not returned to the master block 1, the variable "block_no" is incremented by one (step S2), the initial value "0" of the block discrimination memory unit 27 is set as the block designation of the header portion (step S3), the block discrimination setting control unit 26 is set as the process designation of the header portion (step S4), and the command packet that the command portion thereof is designated as "2" being the content of the variable "block_no" is then sent (steps S5 and S6).

The block discrimination of the first slave block 2 has been already set to "1", and this block discrimination does not coincide with the block designation, whereby the packet selector 21 of the slave block 2 transfers this command packet to a data transmission path 22. Then, the transferred command packet is sent to a next slave block 2' as it is, through a packet deselector 24 and a data transmission path 3'.

Next, the slave block 2' receives the sent command packet. Here, in the slave block 2', because the content of the block discrimination memory unit coincides with the block designation of the header portion, the packet selector transfers the received command packet to the block discrimination setting control unit. Therefore, the block discrimination setting control unit sets "2" being the content of the command portion of the command packet to the block discrimination memory unit.

In the same way, the block discrimination information of each slave block is set to "1", "2", . . . sequentially in order closer to the master block. Consequently, after the block discrimination information was set to a last slave block 2" in response to the command packet sent through a data transmission path 3", the variable "block_no" is incremented by the CPU 11, the initial value "0" of the block discrimination memory unit is set as the block designation of the header portion, the block discrimination setting control unit is set as the process designation, and the command packet of which the command portion is the content of the variable "block_no" is sent. In such a situation, because the values other than "0" being the initial value have been set in the block discrimination memory units of all the slave blocks, the command packet in question is sent to the slave blocks through their data transmission paths and then returned to the master block 1 as it is through a data transmission path 4.

In response to the return of the command packet, the CPU 11 in the master block 1 can know that the setting of the block discrimination information of all the slave blocks has been ended. Moreover, in response to the number of the sent command packets, the CPU 11 can know the number of slave blocks.

Incidentally, in the above explanation, the block discrimination information of each slave block is set to "1", "2", . . . sequentially in order closer to the master block. However, such order need not be set. That is, as the block discrimination information of each slave block, it only has to set a value which is other than the initial value of the block discrimination memory unit and is unique in each slave block.

Hereinafter, other embodiments of the present invention will be explained.

That is, it is needless to say that the object of the present invention can be achieved by supplying a recording medium (or a storage medium) recording thereon program codes of software to realize the functions of the above embodiment to a system or an apparatus, and causing a computer (or CPU, MPU) in the system or the apparatus to read and execute the program codes stored in the recording medium. In this case, the program codes themselves read out of the recording medium realize the functions of the above embodiment. Therefore, the recording medium storing these program codes constitutes the present invention. As the recording medium from which the program codes are supplied, e.g., a floppy disk, a hard disk, an optical disk, a magneto-optical disk, a CD-ROM, a CD-R, a magnetic tape, a non-volatile memory card, a ROM or the like can be used.

Further, it is needless to say that the present invention includes not only a case where the functions of the above embodiment are realized by executing the program codes read by the computer, but also a case where an OS (operating system) or the like running on the computer performs a part or all of the actual processes on the basis of instructions of the program codes and thus the functions of the above embodiment are realized by such the processes.

Furthermore, it is needless to say that the present invention also includes a case where, after the program codes read out of the storage medium are written into a function expansion board inserted in the computer or a memory in a function expansion unit connected to the computer, a CPU or the like provided in the function expansion board or the function expansion unit performs a part or all of the actual processes on the basis of the instructions of the program codes, and thus the functions of the above embodiment are realized by such the processes.

When the present invention is applied to the above recording medium, the program codes corresponding to the above-explained flow chart are stored in the recording medium.

As explained above, in the above embodiments, because the block discrimination can be favorably reallocated by common software, it is unnecessary to change the software even if the number of the slave blocks changes, whereby it is possible to develop various kinds of similar systems in a short period.

As many apparently widely different embodiments of the present invention can be made without departing from the spirit and scope thereof, it is to be understood that the present invention is not limited to the specific embodiments thereof expect as defined in the appended claims.

What is claimed is:

1. An information processing system which includes an information processing apparatus for dividing image data into predetermined divided image data and transmitting the divided image data to an image processing apparatus together with device information, and plural image processing apparatuses for performing, according to the device information, processes to the divided image data transmitted from said information processing apparatus, wherein said information processing apparatus comprises
  a setting unit, adapted to set the device information and command information, and
  a transmission unit, adapted to transmit data including the device information and the command information set by said setting means to said image processing apparatus, and said image processing apparatus comprises
  a memory unit, adapted to store the device information transmitted by said transmission unit of said information processing apparatus,
  a device information setting unit, adapted to set the device information to said memory unit, and a selection unit, adapted to, according to the device information included in the data transmitted by said transmission unit of said information processing apparatus, cause said device information setting unit to set the device information according to the command information to said memory unit, change the command information of the data, and select whether to transmit the data of which the command information has been changed to the next image processing apparatus or transmit the transmitted data to the next image processing apparatus as it is.

2. An information processing system according to claim 1, wherein said next image processing apparatus performs the selection by the selection unit, as well as said image processing apparatus.

3. An information processing system according to claim 1, wherein said image processing apparatus further comprises a transmission unit adapted to transmit the data to said information processing apparatus.

4. An information processing system according to claim 1, wherein said device information setting unit sets the device information to an initial value, and said image processing apparatus further comprises an initialization unit to initialize said memory unit.

5. A control method which controls an information processing system including an information processing apparatus for dividing image data into predetermined divided image data and transmitting the divided image data to an image processing apparatus together with device information, and plural image processing apparatuses for performing, according to the device information, processes to the divided image data transmitted from the information processing apparatus, said method comprising:

a setting step of setting the device information and command information in the information processing apparatus;

a transmission step of transmitting data including the device information and the command information set in said setting step, from the information processing apparatus to the image processing apparatus;

a storage step of storing, in a memory unit of the image processing apparatus, the device information transmitted from the information processing apparatus in said transmission step;

a device information setting step of setting the device information to the memory unit; and a selection step of, according to the device information included in the data transmitted from the information processing apparatus in said transmission step, causing said device information setting step to set the device information according to the command information to the memory unit, change the command information of the data, and select whether to transmit the data of which the command information has been changed to the next image processing apparatus or transmit the transmitted data to the next image processing apparatus as it is.

6. A computer readable medium having a stored computer program which is used to control an information processing system including an information processing apparatus for dividing image data into predetermined divided image data and transmitting the divided image data to an image processing apparatus together with device information, and plural image processing apparatuses for performing, according to the device information, processes to the divided image data transmitted from the information processing apparatus, said program comprising: a setting module for setting the device information and command information in the information processing apparatus; a transmission module for transmitting data including the device information and the command information set by said setting module, from the information processing apparatus to the image processing apparatus; a storage module for storing, in a memory unit of the image processing apparatus, the device information transmitted from the information processing apparatus by said transmission module; a device information setting module for setting the device information to the memory unit; and a selection module for, according to the device information included in the data transmitted from the information processing apparatus by said transmission module, causing said device information setting module to set the device information according to the command information to the memory unit, change the command information of the data, and select whether to transmit the data of which the command information has been changed to the next image processing apparatus or transmit the transmitted data to the next image processing apparatus as it is.

* * * * *

UNITED STATES PATENT AND TRADEMARK OFFICE
CERTIFICATE OF CORRECTION

| | |
|---|---|
| PATENT NO. | : 7,336,385 B2 |
| APPLICATION NO. | : 10/718603 |
| DATED | : February 26, 2008 |
| INVENTOR(S) | : Yokoyama |

It is certified that error appears in the above-identified patent and that said Letters Patent is hereby corrected as shown below:

COVER SHEET:
    (75) Inventor: "Noboru Yokoyama, Toyko (JP)" should read -- Noboru Yokoyama, Tokyo (JP) --.

COLUMN 1:
    Line 13, "increase," should read -- have increased, --;
    Line 14, "increases." should read -- has increased. --; and
    Line 18, "increases." should read -- has increased. --.

COLUMN 2:
    Line 5, "are" should read -- is --; and
    Line 27, "the-header" should read -- the header --.

COLUMN 3:
    Line 49, "object" should read -- objects --.

COLUMN 4:
    Line 31, "above" should read -- the above --.

COLUMN 6:
    Line 44, "expect" should read -- except --.

UNITED STATES PATENT AND TRADEMARK OFFICE
CERTIFICATE OF CORRECTION

PATENT NO. : 7,336,385 B2
APPLICATION NO. : 10/718603
DATED : February 26, 2008
INVENTOR(S) : Yokoyama It is certified that error appears in the above-identified patent and that said Letters Patent is hereby corrected as shown below:

<u>COLUMN 8</u>:
       Line 22, "comprising:" should read -- comprising: ¶ --;
       Line 24, "apparatus;" should read -- apparatus; ¶ --;
       Line 29, "apparatus;" should read -- apparatus; ¶ --;
       Line 32, "module;" should read -- module; ¶ --; and
       Line 34, "and" should read -- and ¶ --.

Signed and Sealed this

Twenty-third Day of December, 2008

JON W. DUDAS
*Director of the United States Patent and Trademark Office*